July 29, 1924. 1,503,284
F. R. PARKER
HIGH POTENTIAL ELECTRICITY ARRESTER
Original Filed March 8, 1907

WITNESSES:
Frances R. Parker.
Otto Kischel.

INVENTOR:
Frederick R. Parker.

Patented July 29, 1924.

1,503,284

UNITED STATES PATENT OFFICE.

FREDERICK R. PARKER, OF CHICAGO, ILLINOIS.

HIGH-POTENTIAL-ELECTRICITY ARRESTER.

Original application filed March 8, 1907, Serial No. 361,354. Renewed January 8, 1920, Serial No. 350,249. Patent No. 1,350,329, dated August 24, 1920. Divided and this application filed July 23, 1920. Serial No. 398,560.

*To all whom it may concern:*

Be it known that I, FREDERICK R. PARKER, a citizen of the United States of America, residing at Chicago, in the county of Cook and State of Illinois, have invented a new and useful High-Potential-Electricity Arrester, of which the following is a specification, reference being had to the accompanying sheet of drawings, illustrating the invention.

This application is a division of my patent application Serial No. 350,249, filed January 8, 1920, on Electrical protective apparatus, which was originally filed under Serial No. 361,354, on March 8, 1907, and which issued into Patent No. 1,350,329, on Aug. 24, 1920.

This present invention relates to high-potential electricity arresters and dielectric members therefor.

The principal objects of this invention are, to provide improved high-potential electricity arresters, and improved dielectric members for high-potential electricity arresters, substantially as herein set forth.

Other objects will be apparent from the following specification.

Figure 1:
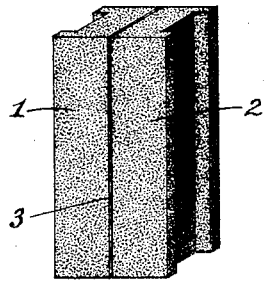
Figure 2:
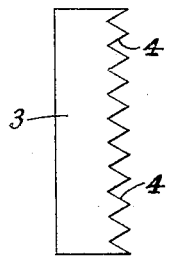

In the accompanying drawings illustrating the preferred form of my invention, Figure 1 is a perspective view of one form of my improved high-potential electricity arrester; and Fig. 2 is a side view of one form of my improved dielectric member for high-potential electricity arresters.

Like characters refer to like parts in the several figures.

Referring to the drawings, 1 and 2 are the electrodes of a high-potential electricity arrester or lightning arrester, such electrodes being preferably made of carbon, or other suitable material. Between the electrodes 1 and 2 is placed a thin dielectric member 3, to hold the electrodes 1 and 2 a slight distance apart from each other. In the use of the arrester, one of the electrodes 1 2 is preferably connected to the line to be protected from lightning or other high-potential electricity, and the other electrode is preferably connected to ground, in a manner well understood.

I provide an edge of the dielectric member 3 with a plurality of notches 4 4, preferably V-shaped notches, preferably as shown in Fig. 2. In the use of this dielectric member in a high-potential electricity arrester, the notched edge 4 is preferably placed downwardly or at the bottom of the arrester. The notches 4 4 provide openings in the dielectric member between the electrodes 1 and 2, through which openings discharges of electricity pass from one of the electrodes 1 2 to the other in the use of the arrester. The notches 4 4 along the bottom of the arrester permit particles of the electrodes 1 and 2 which may be broken off of the electrodes by the discharges through the arrester, or particles of disintegration, to fall from between the electrodes 1 and 2, thus preventing such particles from forming a short-circuit between the electrodes 1 and 2 and thereby putting the arrester out of service. These notches 4 4, therefore, make the arrester self-cleaning; a feature which is very desirable and which is not generally provided in high-potential electricity arresters. The notches 4 4 also break up or scatter a heavy discharge through the arrester, thereby diminishing its intensity and destructive effect at any one point. This prevents the breaking off of large pieces of the electrodes during a heavy discharge (pieces too large to fall from between the electrodes), and consequently greatly lessens the possibility of short-circuits in the arrester and at the same time preserves the electrodes.

I preferably make the dielectric member 3 of heat-softenable or heat-susceptible material, so that upon a continued arc through the arrester the dielectric may become softened by the excessive heating and thus permit the usual spring pressure on one or both of the electrodes to press the electrodes together or into contact with each other, to stop the arc in the arrester and the consequent heating thereof. Dielectric members of heat-softenable or heat-susceptible material, and high-potential electricity arresters utilizing such dielectric members, are claimed broadly in the Higgins United States Letters Patent No. 1,110,259, dated September 8, 1914, which patent is assigned to me.

In many instances it is very desirable in arresters to have heat-softenable or heat-susceptible dielectric members which are non-inflammable, so that when they are softened by excessive heating and pressed out from between the electrodes of the arresters they will not burn or start a fire and thus cause serious damage. As a dielectric member to fill this requirement I preferably employ a thin sheet of soft glass, preferably notched along an edge thereof as shown in Fig. 2. With such a dielectric member, when a continued arc is formed in the arrester the glass is softened by the intense heat of the arc and pressed out from between the electrodes as above set forth sufficiently to allow the electrodes to come together and thereby form a conductive path through the arrester; thus stopping the arc and the excessive heating thereof. Such a dielectric member, formed substantially as shown in Fig. 2, will also provide an arrester which is self-cleaning. Dielectric members of non-inflammable, heat-softenable or heat-susceptible material, and such dielectric members of glass, as well as high-potential electricity arresters utilizing such dielectric members, are claimed broadly in my United States Letters Patent No. 1,179,380, dated April 11, 1916.

I do not wish to limit this invention to the exact details of construction herein set forth, as various modifications thereof may be made or utilized without departing from the scope of the appended claims.

What I claim herein as my invention is:

1. A dielectric member for a high-potential electricity arrester, having a row of relatively small teeth along an edge thereof.

2. A dielectric member for a high-potential electricity arrester, having an edge thereof provided with a row of relatively small notches.

3. A dielectric member for a high-potential electricity arrester, having an edge thereof provided with a row of relatively small V-shaped notches.

4. In a high-potential electricity arrester, a dielectric member arranged in a substantially vertical plane and having a row of relatively small teeth along the lower edge thereof.

5. In a high-potential electricity arrester, a dielectric member arranged in a substantially vertical plane and having the lower edge thereof provided with a row of relatively small notches.

6. In a high-potential electricity arrester, a dielectric member arranged in a substantially vertical plane and having the lower edge thereof provided with a row of relatively small V-shaped notches.

As inventor of the foregoing I hereunto subscribe my name this 21st day of July, 1920.

FREDERICK R. PARKER.

Witnesses:
FRANCES K. PARKER,
OTTO KISCHEL.